June 30, 1970 — O. O. KYTTA — 3,517,588

SERVOMOTOR AND VALVE MEANS

Filed May 29, 1968

INVENTOR.
OSWALD O. KYTTA
BY Richard G. Geib
ATTORNEY

3,517,588
SERVOMOTOR AND VALVE MEANS
Oswald O. Kytta, South Bend, Ind., assignor to The Bendix Corporation, a corporation of Delaware
Filed May 29, 1968, Ser. No. 732,938
Int. Cl. F15b 9/10; F01b 19/00
U.S. Cl. 91—369      12 Claims

ABSTRACT OF THE DISCLOSURE

A servomotor of the fluid pressure type which is improved by a pre-assembled valve means that can be tested prior to utilization to thereby avoid the necessity of rejection of a whole construction for deficiencies in valve piece parts.

SUMMARY

This invention is primarily concerned with the improvement of fluid pressure servomotors such as are within the state of the art for utilization with automobiles and the like in power brake systems therefor. More particularly, the invention is primarily concerned with an improved valve means for such servomotors which will readily lend itself to inspection and testing in a subassembled state.

There is a further object of this invention to provide an improved construction for a servomotor which will involve considerably less expense in manufacturing by an increase in the ease of assembly of the various components thereof.

It is a still further object of this invention to provide a subassembled valve means which includes operator-operated control means and force transmitting means as a package for a fluid pressure servomotor.

DRAWING DESCRIPTION

Figure 1:
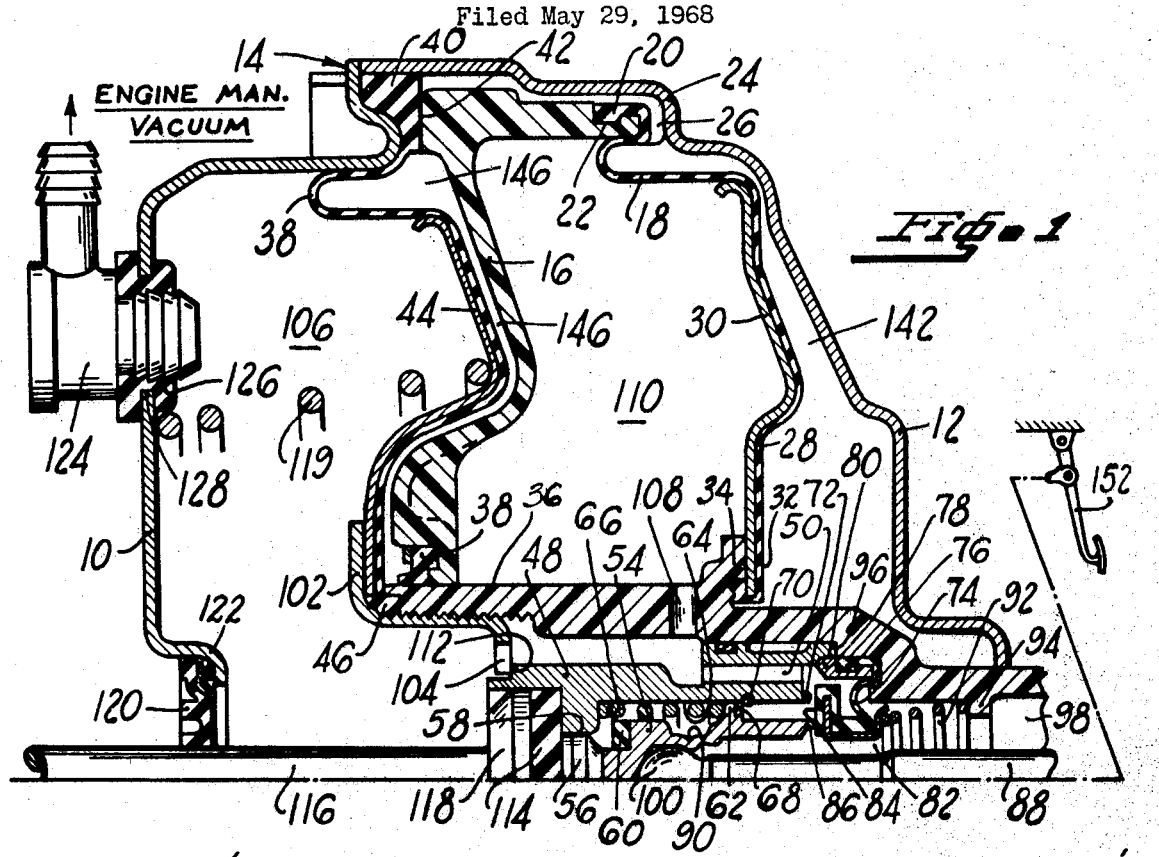
Figure 2:
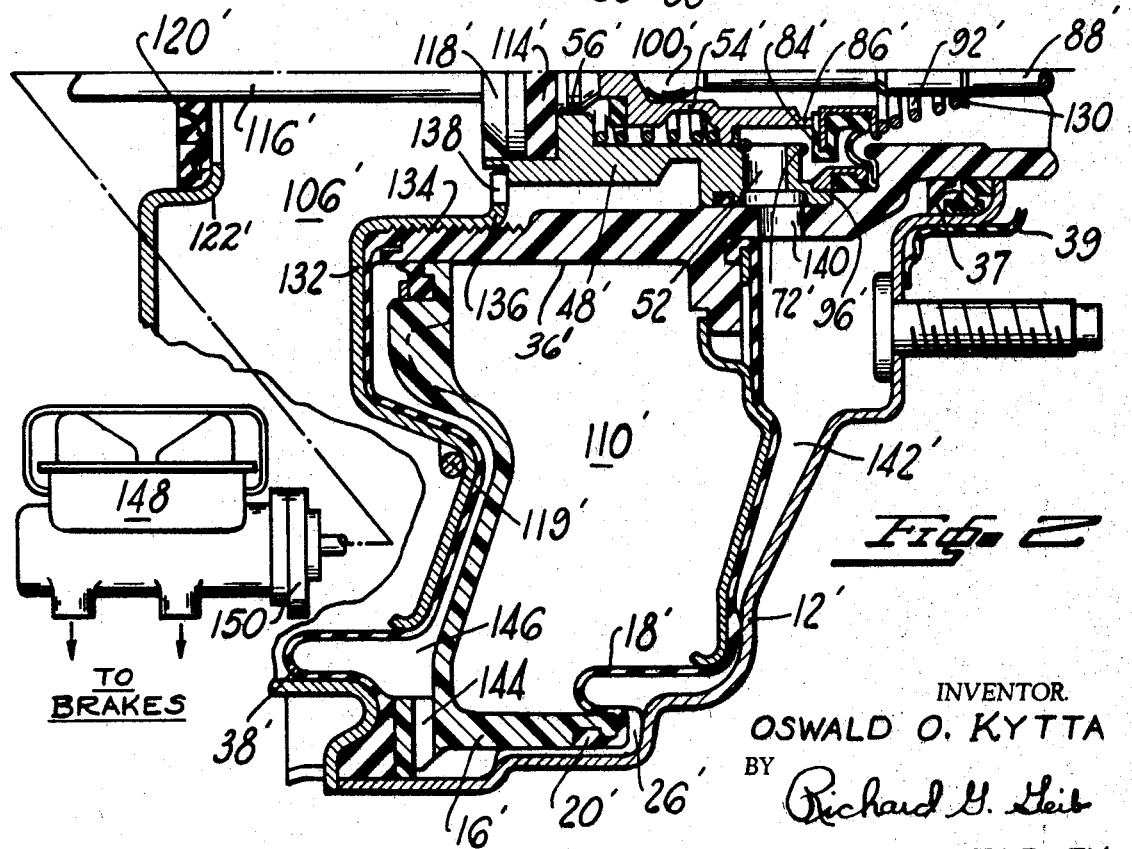

Other objects and advantages of this invention will appear from the following description of the drawings in which:

FIG. 1 is a half section view of a fluid pressure servomotor incorporating the elements of this invention and schematically attached to a brake pedal for a vehicle; and FIG. 2 is a half section view of still another form of a fluid pressure servomotor incorporating the principles of this invention schematically attached to a brake master cylinder.

DETAILED DESCRIPTION

With reference now to FIG. 1, there is shown a servomotor having a housing comprised of a forward shell 10 and a rearward shell 12 joined as at 14 by a bayonet-type twist lock arrangement, such as is more fully described in U.S. Pat. No. 3,083,698, assigned to the common assignee of this patent. Before joining the shells, the internal pieces are assembled within the rear shell 12. More particularly, a partition 16 having a diaphragm 18, assembled thereto by snap fitting its bead 20 into groove 22 of the spacer 16 is placed against a shoulder 24 of the shell 12 leaving air passages 26. The diaphragm 18 has an inner bead 28 fitting around a central opening in a diaphragm reinforcing plate 30, which plate is provided with flanges 32 that are assembled on lugs 34 of a hub 36.

The hub 36 and the partition 16 with the diaphragm assembly aforementioned are preassembled such that the hub projects through the bearing seal 37 (see FIG. 2) in the central opening of the partition 16. Then a diaphragm 38 having a sealing bead 40 bearing against a face 42 of the partition 16 is laid over this subassembly. Next, a diaphragm reinforcing plate 44 is laid onto the diaphragm 38 over its inner bead 46.

In the meantime, a valve means is assembled. More particularly, a valve housing 48 having an axial passage 50 and a radial passage 52 (see FIG. 2) is fitted with a valve plunger 54 having a forward face 56 slidably inserted within a small portion 58 of a stepped bore through the sleeve 48. This valve plunger is fitted, prior to assembly to housing 48, with a noise deadening ring 60. Upon assembly a flange 62 of plunger 54 is slidably carried by the larger portion 64 of the stepped bore in the sleeve 48. Between the flange 62 and the sleeve 48, a spring 66 is interposed on assembly to maintain the flange 62 against a ring 68 located by a snap ring 70 in the bore of the sleeve 48. The sleeve 48 is provided with an annular valve seat 72 facing inwardly of the servomotor, or to the rear, between the passages 50 and 52. A flexible poppet 74 having a mounting flange 76 assembling it to a ring 78 fitted within the groove 80 on the inward face of the sleeve 48 closes the valve means except for annular passage 82 through the poppet 74. Poppet 74 has a valve face 84 normally urged by valve seat 86 of plunger 54 to be spaced from the valve seat 72. A valve control push rod 88 is fitted within the plunger 54 prior to its assembly in the sleeve 48, as by swaging a portion of the plunger 54 as at 90 about a ball end 100 of the push rod 88.

With regard to the structure of FIG. 1, the valve means is now ready for assembly within the hub 36. Prior to this assembly, however, a valve follow-up spring 92 is placed on a depending shoulder 94 of the hub 36 and then the subassembly of the valve elements inclusive of the sleeve 48 is inserted into the hub until the inner face of the sleeve abuts on shoulder 96 of hub 36. In so doing, the valve mounting flange 76 is compressed between the ring 78 and the hub 36 to seal the cavity in the hub structure 36 therebehind from the passage 98 in the hub structure leading outwardly to atmospheric pressure without the housing. Next, a sleeve nut 102 is threaded into the hub 36 compressing the bead 46 of the diaphragm 38 and maintaining the diaphragm retainer 44 and diaphragm 38 integral with the hub 36. The sleeve nut 102 has a plurality of passages 104 communicating chamber 106 ahead the diaphragm 38 with the inside of the hub 36.

It should be readily observed that the hub 36 is provided with radial openings 108 leading from the interior of the hub to chamber 110 ahead of the diaphragm 18 and behind the partition 16. Thus, the chambers 106 and 110 are always in communication.

Getting back to the assembly of the valve means, the passages 104 in the sleeve nut 102 are in depending flanges of the sleeve nut that bear on shoulder 112 of the sleeve 48 to maintain the sleeve against the shoulder 96 of the hub. Thereafter, a reaction disc preferably of a known durometer rubber 114 is placed within the cavity of the sleeve 48 to close the small bore 58 from the chamber 106, and a force transmitting rod 116 having an area or face 118 equal to disc 114 is inserted into the cavity of the sleeve 48 receiving the disc 114. Spring clips (not shown) may be utilized in maintaining the face 118 of rod on the disc 114.

Next, the shell 10 is ready to be assembled to the shell 12. In preparation for this assembly a seal 120 having an opening for the force transmitting rod 116 is inserted in an upset portion 122 of shell 10 such that upon assembly, as at 14, of the shell 10 to the shell 12 the force transmitting rod 116 projects from the housing. Also a return spring 119 is laid over plate 44 prior to assembly of shells 10 and 12. If desired, a vacuum check valve 124 is inserted into a grommet 126 about an opening 128 in the shell 10 prior to the assembly of the shell 10 to the shell 12, but, in any event, the vacuum check valve 124 is assembled to the shell 10 to complete the construction of the power section of the servomotor.

Essentially, the manner of assembly and the construction of the servomotor shown in FIG. 2 is the same as that of FIG. 1. Two notable differences are in the location of valve follow-up spring 92' on a retainer ring 130 affixed to the push rod 88' such that this valve return spring may be a preassembled item with the valve means. Also, diaphragm support plate 132 is inclusive of an inner projection having threads 134 for joining the diaphragm 38' to the hub 36' and locating valve sleeve 48' by means of flange 136 having openings 138 on shoulder 96' of the hub 36'. It should also be noted, with reference to FIG. 2, that the hub 36' is provided with a radial passage 140 adjacent the radial passage 52 in the sleeves 48 or 48' leading to control chamber 142 between the diaphragm 18' or 18 and the rear shell 12 or 12'. Passages 26 and 26' created by notches in the bead 20 and 20' of the diaphragms 18 and 18' communicate chamber 142 between the partition 16 and 16' and the shells 12 and 12' to radial passage 144 communicated with control chamber 146 between diaphragms 38 and 38' and partitions 16 and 16'. In addition, the reader's attention is directed to FIG. 2 to show the bearing seal 37 and the rubber boot 39 which are assembled within the outwardly turned section about a central opening in the housing 12 for supporting the hubs 36 and 36' as they project from the servomotor shell 12 and 12'.

Finally, a master cylinder 148 is adapted to receive the force transmitting rods 116 or 116' and by means of flange 150 is mounted to the forward shell 10 of the vervomotor to complete its assembly.

OPERATION

In operation, the driver of the vehicle will depress brake pedal 152 to move push rods 88 or 88' depending upon the construction utilized, inwardly, whereby the plungers 54 or 54' permit the seating of valve face 84 or 84' onto valve seats 72 or 72' of the sleeves 48 or 48'. Further inward movement of push rods 88 or 88' will remove valve seats 86 or 86' of the plungers 54 or 54' from the valve face such that atmospheric air entering the hub via passage 98 (see FIG. 1) will flow via the opening 82 in the flexible poppet to the radial passage 52 into the control chamber 142. At this time, a pressure differential is created across the diaphragms 18, 18' and 38, 38' and that atmospheric air is on one side and vacuum via the check valve is on the other. Thus, a force is created to move the force transmitting rods 116 or 116' inwardly of the master cylinder 148 to pressurize the fluid therein for the actuation of the vehicle brakes (not shown).

Having described two operative embodiments of the many possible for this invention, the scope of the invention is now set forth in the following claims:

I claim:
1. In a fluid pressure servomotor having movable wall means operatively arranged within a housing, a valve means carried within a hub of the movable wall means, said valve means comprising:
  a sleeve having an annular valve seat between an axial passage means thereof and a radial port means thereof;
  an annular flexible valve poppet affixed to said sleeve with a face adapted to abut said valve seat;
  a valve plunger slidably carried in an axial bore of said sleeve, said plunger being spring biased to project from said sleeve and having an annular valve seat concentric with the annular valve seat of said sleeve which under the biasing effect on the plunger normally abuts said face and thus closes the central opening through the poppet while maintaining said face spaced from the seat of said sleeve such that said passage means and port means are communicated;
  a reaction means within said sleeve sealing said axial bore ahead of said plunger, said reaction means including a force transmitting rod;
  a valve push rod affixed to said plunger and projecting through said hub to be controlled remotely of said housing; and
  means to locate said sleeve in said hub inclusive of a spring to provide follow-up action for said poppet, said means holding said sleeve against a shoulder within said hub such that the axial passage means is communicated to one side of the movable wall means and the radial port means is open to a passage through the hub to the other side of the movable wall means.

2. The structure of claim 1 wherein said valve plunger is provided with noise deadening means arranged to be between said plunger and said sleeve.

3. The structure of claim 1 wherein said annular poppet has a mounting flange to which a ring is mounted, which ring is affixed to said sleeve to mount said poppet thereto.

4. The structure of claim 3 wherein said mounting flange is compressed between said ring and said hub upon assembly to seal a pressure inlet of the hub from the passage through the hub leading to said other side of the movable wall means.

5. The structure of claim 1 wherein said means to locate said sleeve within said hub on the end opposite the spring comprises a sleeve nut with a radially outward flange to unite the movable wall means to the hub and an inwardly turned flange abutting a shoulder of said sleeve.

6. The structure of claim 1 wherein said valve plunger is located in said sleeve by a snap ring cooperating with a guiding flange of said plunger that with its end supported by the axial bore of said sleeve provides spaced supporting areas of said plunger in said sleeve whereby angular alignment of the plunger in the sleeve is maintained regardless of misaligning forces as may be imparted thereto by said valve push rod.

7. A tandem fluid pressure servomotor comprising:
  a first sealing member;
  a second sealing member;
  a partition;
  a housing means for assembling said first member and said second member on opposite sides of said partition;
  movable wall means having portions cooperating with both said first member and said second member to create first and second variable volume chambers on both sides of said movable wall one of which is a control chamber and the other of which is a reference pressure chamber with like chambers being intercommunicated, said wall means having a hub having an axial body extending from said housing and slidably carried in an opening of said partition by a bearing seal means to provide spaced support for said wall to preclude angular misalignment thereof, said hub having a stepped passage therewithin to define at least one forwardly facing shoulder;
  a valve subassembly operatively arranged within the passage of said hub to abut said shoulder to control communication of said reference chambers to said control chambers and when this communication is closed thereby to introduce control pressure to said control chambers creating a pressure differential across said movable wall means, said valve assembly consisting of a sleeve with an annular rearwardly facing valve seat between an axial passage in the sleeve and a radial passage in the sleeve and about a stepped bore through the sleeve, a valve plunger having a small portion slidable in the smaller portion of the stepped bore and a flange slidable in the larger portion of the bore with a trailing body terminating in a rearwardly facing valve seat concentric with and inwardly spaced from the similar valve seat of the sleeve, which plunger is biased by a spring between the sleeve and the flange to normally hold it on a removable stop means of the sleeve assembled thereto after insertion of the plunger, an annular, flexible poppet assembled to said sleeve having a depending forwardly biased valve face aligned with both the sleeve valve seat and the plunger valve seat and normally on said plunger valve seat to be spaced from said sleeve valve seat, and an operator-operated means assembled to said plunger such that said flexible poppet follow-up action when said operator-operated means actuates said plunger which is stopped by said sleeve valve seat before said plunger valve seat is removed from said valve face; and force transmitting means operatively connected to said valve means via a reaction means sealing said stepped bore ahead of the smaller portion of said plunger, said force transmitting means being thereby projectable from said housing via an appropriate sealed opening to actuate a means thereto connected.

8. The structure of claim 7 wherein said valve face is biased by a spring between a shoulder of said hub and said flexible poppet.

9. The structure of claim 7 wherein said valve face is biased by a spring between said operator-operated means and said flexible poppet.

10. The structure of claim 7 wherein said flexible poppet has a mounting flange sealing the assembly of said valve means with said hub.

11. The structure of claim 7 wherein the first sealing member and the second sealing member are similar flexible diaphragms and said movable wall means is inclusive of diaphragm support plates with means to integrate themselves and the flexible diaphragms to the hub.

12. The structure of claim 11 where one of the diaphragm support plates is inclusive of a threaded boss for mating with internal threads of the hub with the inner position of the flexible diaphragm interposed to seal the assembly thereof.

References Cited
UNITED STATES PATENTS 3,091,255   5/1963   Wahlstrom.
3,096,689   7/1963   Kytta.
3,183,789   5/1965   Stelzer.

PAUL E. MASLOUSKY, Primary Examiner

U.S. Cl. X.R.
91—376; 92—48.